United States Patent
Kawai

(10) Patent No.: US 8,476,851 B2
(45) Date of Patent: Jul. 2, 2013

(54) MOTOR MAGNETIC POLE POSITION CORRECTION METHOD

(75) Inventor: Yoichi Kawai, Aichi (JP)

(73) Assignee: OKUMA Corporation, Aichi (JP)

( * ) Notice: Subject to any disclaimer, the term of this patent is extended or adjusted under 35 U.S.C. 154(b) by 75 days.

(21) Appl. No.: 13/300,080

(22) Filed: Nov. 18, 2011

(65) Prior Publication Data

US 2012/0133311 A1 May 31, 2012

(30) Foreign Application Priority Data

Nov. 25, 2010 (JP) .................................. 2010-261890

(51) Int. Cl.
*H02P 6/16* (2006.01)
*H02P 6/00* (2006.01)

(52) U.S. Cl.
USPC ............ 318/400.12; 318/400.32; 318/400.01; 318/700; 318/705

(58) Field of Classification Search
USPC .................. 318/400.12, 400.32, 400.01, 700, 318/705
See application file for complete search history.

(56) References Cited

U.S. PATENT DOCUMENTS

| | | | |
|---|---|---|---|
| 5,850,130 A * | 12/1998 | Fujisaki et al. | 318/400.2 |
| 6,404,152 B1 * | 6/2002 | Kobayashi et al. | 318/400.23 |
| 6,552,453 B2 * | 4/2003 | Ohiwa et al. | 310/68 B |
| 7,872,438 B2 * | 1/2011 | Morimoto et al. | 318/700 |
| 2002/0047348 A1 * | 4/2002 | Ohiwa et al. | 310/68 B |

FOREIGN PATENT DOCUMENTS

JP   2000-166278 A   6/2000

OTHER PUBLICATIONS

Patent Abstract for Japanese Publication No. 2000-166278 Published Jun. 16, 2000 (1 page).

* cited by examiner

*Primary Examiner* — Bentsu Ro
*Assistant Examiner* — Gabriel Agared
(74) *Attorney, Agent, or Firm* — Osha • Liang LLP

(57) ABSTRACT

A motor magnetic pole position correction method includes preventing a movement of a movable element of a direct drive motor by mechanical brake (step S9), generating a command that designates a position spaced or separated from the present position (step S10), detecting a torque command value of the direct drive motor (step S12), determining a magnetic pole position correction value based on a comparison between the detected torque command value and a predetermined threshold value (steps S14 and S16), storing the determined magnetic pole position correction value in a memory (step S18), and performing motor control using an electrical angle offset value obtained based on the magnetic pole position correction value stored in the memory.

6 Claims, 6 Drawing Sheets

MOTOR MAGNETIC POLE POSITION CORRECTION METHOD

PRIORITY INFORMATION

This application claims priority to Japanese Patent Application No. 2010-261890, filed on Nov. 25, 2010, which is incorporated herein by reference in its entirety.

BACKGROUND

1. Technical Field

The present invention relates to a linear type direct drive motor or a rotary type direct drive motor, which can be used to table of a machine tool. The present invention relates to a technique capable of preventing the output torque from decreasing when a mounting error occurs between a motor and a position detector.

2. Related Art

Direct drive motors are usable to realize high-speed and high-accurate positioning of the table of a machine tool when a motor is used to drive a table directly without using any ball screw or any speed reduction device.

When the motor is a direct drive type, the positioning accuracy of the motor directly influences the positioning accuracy of the table because of non-presence of a speed reduction mechanism. Therefore, the direct drive motor is required to be accurate enough in positioning. In general, the direct drive motor requires a high-resolution position detector to detect the position of its table (movable element of the direct drive motor) when the motor operates.

In general, the linear direct drive motor is composed of a movable element (i.e., a moving body) and a stator fixed to a bed. On the other hand, the rotary direct drive motor is composed of a rotor (i.e., a moving body) and a stator. The present invention is applicable not only to the linear drive motor but also to the rotary drive motor. In the following description, the terminology "movable element" includes various types of moving bodies, including the above-described rotor of the rotary direct drive motor.

FIG. 8 is a block diagram illustrating a circuit configuration of a control system for the above-described direct drive motor. The control system for a direct drive motor 11 includes a position detector 12, two proportional amplifiers 21 and 22, a current distributor 23, an integrating amplifier 24, a current control unit 25, a differentiator 26, a three-phase PWM inverter 28, and a current detector 29.

In the control system illustrated in FIG. 8, if a position command θ* is input, the proportional amplifier 21 amplifies a difference between an input command value of the position command θ* and a detection value obtained by the position detector 12 (i.e., the position of a movable element in the direct drive motor 11). The proportional amplifier 21 outputs the amplified difference as a speed command V* for the movable element.

Then, the proportional amplifier 22 and the integrating amplifier 24 cooperatively perform PI operation on a difference between the speed command V* and the speed of the movable element to generate a torque command T*.

The differentiator 26 can obtain the speed of the movable element by differentiating the detection value obtained by the position detector 12. The current distributor 23 receives the torque command T* and generates two of three-phase current commands Iu*, Iv*, and Iw* (i.e., current commands Iu* and Iv*). The current distributor 23 outputs the generated current commands Iu* and Iv* to the current control unit 25. In this case, in generating the current commands, the current distributor 23 takes the detection value supplied from the position detector 12 into consideration.

The current control unit 25 generates three-phase voltage commands eu*, ev*, and ew* based on the current commands Iu* and Iv* received from the current distributor 23 as well as based on a current command Iw* that can be derived from a formula representing the relationship iu*+iv*+iw*=0. The current control unit 25 outputs the generated three-phase voltage commands eu*, ev*, and ew* to the three-phase PWM inverter 28.

The three-phase PWM inverter 28 converts a direct current (DC) voltage supplied from a DC power source 27 into three-phase alternating current (AC) voltage components based on the three-phase voltage commands eu*, ev*, and ew*. The direct drive motor 11 can be driven when the three-phase AC voltage components are applied from the three-phase PWM inverter 28.

The voltage components actually applied to the direct drive motor 11 are three-phase voltage commands eu*, ev*, and ew* that the current control unit 25 can obtain with reference to differences relative to current detection values iu, iv, and iw detected by the current detector 29.

FIG. 9 illustrates thrust/torque characteristics obtainable when the current phase slides in a state where the movable element of the direct drive motor 11 is fixed. It is understood from FIG. 9 that if the current remains the same the thrust/torque of the direct drive motor 11 can be maximized when the current phase is controlled to be 90°.

To generate the thrust/torque of the direct drive motor 11 efficiently, it is required to control the phase of current supplied to a stator coil of the direct drive motor 11 to have a predetermined phase difference relative to the magnetic pole position of the movable element.

Therefore, a relative positional relationship between the actual position of the movable element and the position detection value detected by the position detector 12 is required to be identical to a predetermined positional relationship having been set beforehand in a control circuit.

However, it is usual that a mounting error occurs between the direct drive motor 11 and the position detector 12 due to clearances provided for respective mounting holes and female screw holes, or as a result of mechanical errors in machining, such as positional deviations between the mounting holes and the female screw holes. If the mounting error occurs, the current phase θ1 becomes equal to 90°+an error component (electrical angle). As a result, the output torque decreases.

Further, the direct drive motor 11 employs a multi-polar structure that can improve the positioning accuracy of the motor. Employing the multi-polar structure is advantageous in that a motor control angle relative to a motor moving distance can be increased. However, the multi-polar motor is disadvantageous in that the torque decreases greatly when the mounting error occurs. More specifically, it is now assumed that a rotary type motor is equipped with n pole pairs and has a relationship θ"=nθ', in which θ' represents a mechanical angle and θ" represents an electrical angle.

For example, if a mounting error is equivalent to +1° in terms of the mechanical angle, a motor equipped with four pole pairs has an error amount of +4° in terms of the electrical angle. A motor equipped with 32 pole pairs has an error amount of +32° in terms of the electrical angle.

In this case, as illustrated in FIG. 9, the output torque decreases to a 99.8% level (=0.2% torque reduction) in the former case and to a 85% level (=15% torque reduction) in the latter case. It is understood that the torque of the multi-polar motor greatly decreases if the magnitude of the mounting error becomes larger.

Therefore, if the direct drive motor employs the above-described multi-polar structure, the direct drive motor 11 and the position detector 12 are required to be positioned accurately. However, to assure machining accuracy and ensure assembling, the clearances provided for respective mounting holes and female screw holes of the direct drive motor 11 and the position detector 12 cannot be omitted.

Therefore, as discussed in JP 2000-166278 A, electrically correcting a mounting error after completing the assembling is conventionally known as a magnetic pole position correction method.

However, the magnetic pole position correction method discussed in JP 2000-166278 A is directed to the electrical correction of amounting error between a direct drive motor and a position detector. The method includes calculating a magnetic pole position correction value based on an output of a d-axis current error amplifier while causing the rotation axis of the motor to rotate at a constant speed. Therefore, the magnetic pole position correction method discussed in JP 2000-166278 A is not applicable to a rotation axis whose movable angle is limited and a linear axis whose movable distance is limited.

Further, at an initial state, the positional relationship between the direct drive motor and the position detector may greatly deviate from an optimum magnetic pole position correction value due to a mistake or an error in a mounting operation of the direct drive motor and the position detector. For example, in a state where the above-described magnetic pole position correction is not yet performed, the angular deviation amount may exceed the range of ±90° in terms of the electrical angle.

In this case, the terminology "mistake in the mounting operation" indicates that a movable element or a stator of the motor is erroneously attached to at an angular position different or deviated from a normal angle.

Further, the terminology "mounting error" is amounting angle error that may be caused due to the clearances provided for respective mounting holes and female screw holes, or by mechanical errors in machining, such as positional deviations between the mounting holes and the female screw holes. If the deviation in the positional relationship between the direct drive motor and the position detector in the mounted state exceeds the limit of the ±90° range in terms of the electrical angle, the direct drive motor becomes uncontrollable. In such a situation, the positioning of the motor will fail and the magnetic pole position correction cannot be performed. Further, the table may move abnormally beyond the limit of an estimated movable range and may collide with a neighboring machine component and may ultimately be damaged.

The present invention solves the above-described problems. To this end, the present invention has an object to provide a method applicable to a direct drive motor that is employed for a table. According to the present invention, a control system can correct amounting error between the direct drive motor and a position detector.

Further, another object of the present invention is to provide a method capable of realizing a safe correction if a mounting error occurs between a direct drive motor and a position detector in a case where the direct drive motor is employed for a table.

SUMMARY

To attain the above-described object, the present invention provides a motor magnetic pole position correction method for correcting a relative positional relationship between a movable element position of a direct drive motor and a movable element position detection value detected by a position detector attached to the direct drive motor.

The motor magnetic pole position correction method includes a step of preventing movement of a movable element of the direct drive motor by a mechanical brake, a step of inputting a position command that designates a position different from a present value as a commanded movable element position of the direct drive motor, a step of detecting a torque command value of the direct drive motor, a step of determining a magnetic pole position correction value based on a comparison between the detected torque command value and a predetermined threshold value, a step of storing the determined magnetic pole position correction value in a memory, and a step of performing motor control using an electrical angle offset value obtained based on the magnetic pole position correction value stored in the memory.

In the motor magnetic pole position correction method according to the present invention, it is useful that the step of determining the magnetic pole position correction value includes a step of automatically changing the magnetic pole position correction value while monitoring the torque command value, and a step of searching for a magnetic pole position correction value at which the torque command value becomes smaller than the predetermined threshold value.

Further, in the motor magnetic pole position correction method according to the present invention, it is useful that the step of determining the magnetic pole position correction value includes a step of changing the magnetic pole position correction value, a step of obtaining a difference between a post-change torque command value and a pre-change torque command value, and a step of searching for a magnetic pole position correction value at which the difference changes from a negative value to a positive value.

Further, in the motor magnetic pole position correction method according to the present invention, it is useful to set an upper limit value for the torque command value.

Further, in the motor magnetic pole position correction method according to the present invention, it is useful to add a step of determining that the direct drive motor is in an uncontrollable state if the torque command value of the direct drive motor exceeds the threshold value having been set beforehand when a position control of the direct drive motor is performed in the state where the mechanical braking force is applied to stop the movable element, as a step preceding the step of inputting the position command that designates the position different from the present value as the commanded movable element position of the direct drive motor.

Moreover, in the motor magnetic pole position correction method according to the present invention, it is useful that the direct drive motor and the sensor are positioned and mounted in such a manner that a mounting angle between the direct drive motor and the sensor is in an electrical angle range of ±90 with respect to an optimum magnetic pole position correction value positioned at the center thereof.

The conventional magnetic pole position correction method discussed in JP 2000-166278 A includes calculating a magnetic pole position correction value based on an output of the d-axis current error amplifier while causing the movable element of the motor to rotate at a constant speed. Therefore, it is required to cause the movable element to rotate constantly at the constant speed during the magnetic pole position correction.

Accordingly, if the above-described conventional magnetic pole position correction method is applied to a rotation axis whose movable range is limited, the rotation axis reaches its stroke end before the magnetic pole position correction is completed. Thus, the intended correction cannot be carried out thoroughly. Similarly, if the above-described conventional magnetic pole position correction method is applied to a linear axis, the linear axis reaches its stroke end before the correction is completed. Thus, the correction cannot be carried out thoroughly.

To the contrary, the present invention provides the magnetic pole position correction method that can correct the magnetic pole position in a state where the movable element is fixed. Therefore, the magnetic pole position correction according to the present invention can be applied to a rotation axis whose movable angle is limited or a linear axis whose movable distance is limited.

More specifically, even in a case where a positional relationship between the direct drive motor and a detection origin of the position detector is not in the perfect state, a deviation caused between the actual position of the direct drive motor and a detection value of the position detector can be corrected by a control system. Further, accurate current phase control can be realized. Therefore, the present invention can eliminate any undesirable reduction in output torque when the deviation is caused. Further, even when the direct drive motor is brought into an uncontrollable state, the table cannot move beyond the limit of a predetermined movable range and does not cause any collision with a neighboring component.

DETAILED DESCRIPTION

First Embodiment

Figure 1:
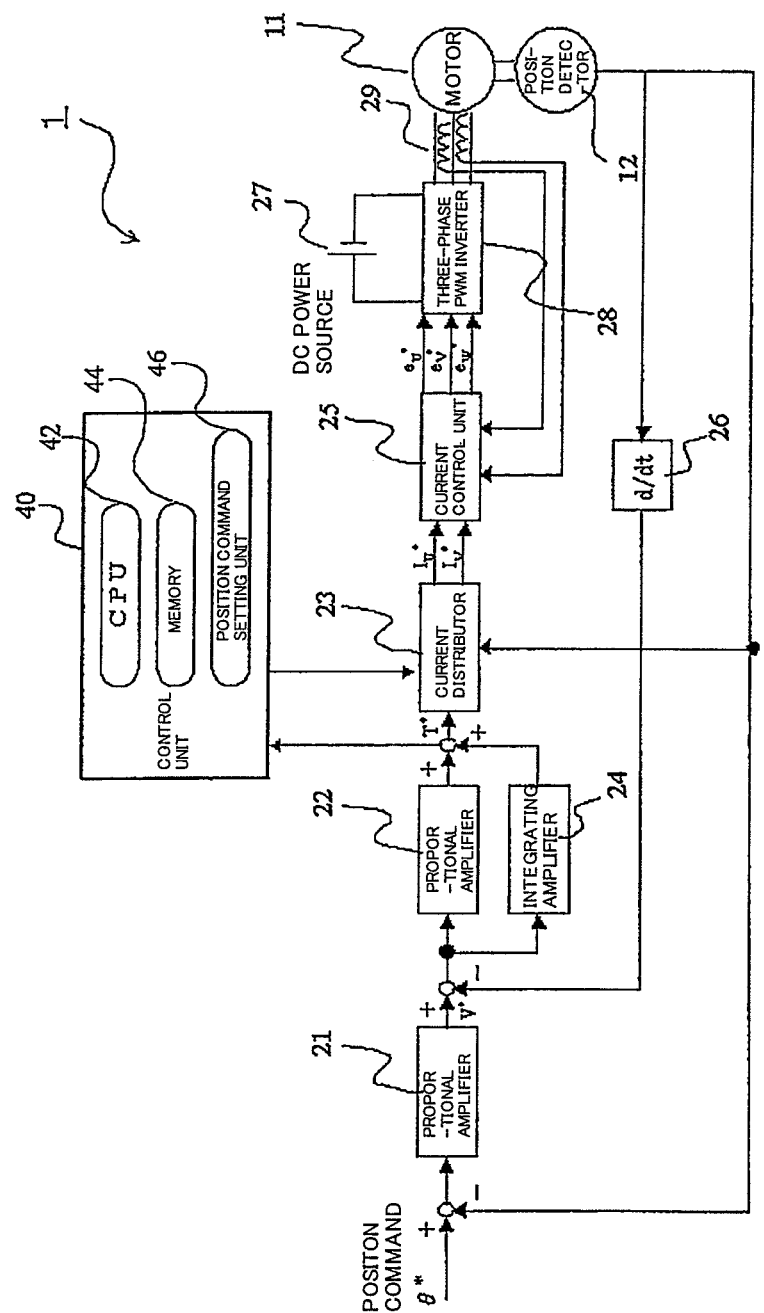
FIG. 1 is a block diagram illustrating a schematic configuration of a motor control system that can realize a motor magnetic pole position correction method according to an embodiment of the present invention.
Figure 2:
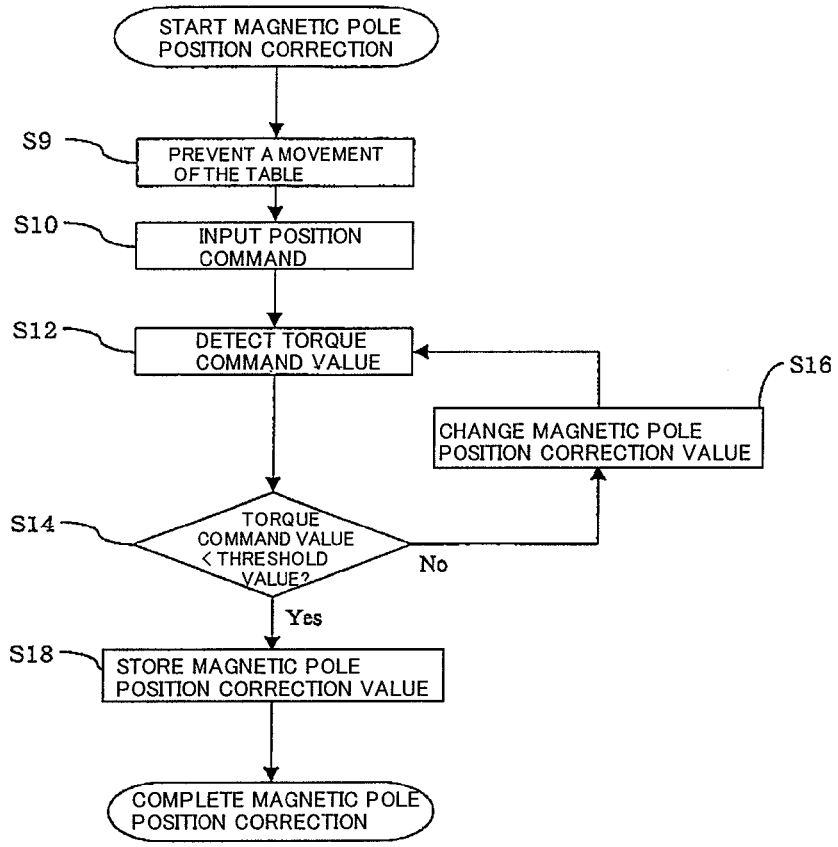
FIG. 2 is a flowchart illustrating a magnetic pole position correction method according to a first embodiment of the present invention.
Figure 3:
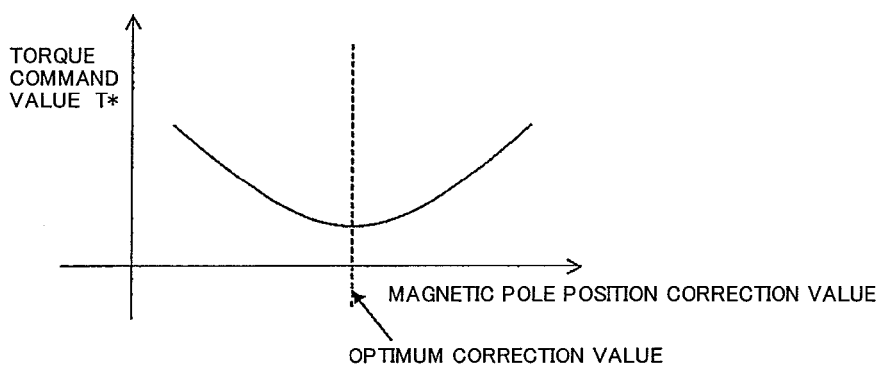
FIG. 3 is a graph illustrating a relationship between magnetic pole position correction value and torque command value according to the present invention.

A first embodiment of the present invention is described below with reference to FIG. 1 to FIG. 3. FIG. 1 is a block diagram illustrating a schematic configuration of a motor control system 1 that can realize a motor magnetic pole position correction method according to an embodiment of the present invention. FIG. 2 is a flowchart illustrating a processing procedure of the motor magnetic pole position correction method according to the first embodiment of the present invention. FIG. 3 illustrates a relationship between magnetic pole position correction value and torque command value T* in a state where a direct drive motor outputs a constant thrust/torque.

The motor control system 1 illustrated in FIG. 1 includes a control unit 40, which includes a central processing unit (CPU) 42, a memory 44, and a position command setting unit 46. The central processing unit 42 is functionally operable to read a magnetic pole position correction program from memory 44 and execute the magnetic pole position correction program.

The memory 44 includes a read only memory (ROM) that stores the magnetic pole position correction program beforehand and a random access memory (RAM) that stores detection data and other rewritable data.

The position command setting unit 46 is functionally operable to set a position command θ*, which is a command indicating the position of a movable element of the direct drive motor, automatically or according to a manual operation of an operator, and outputs the position command θ* to a proportional amplifier 21.

Figure 8:
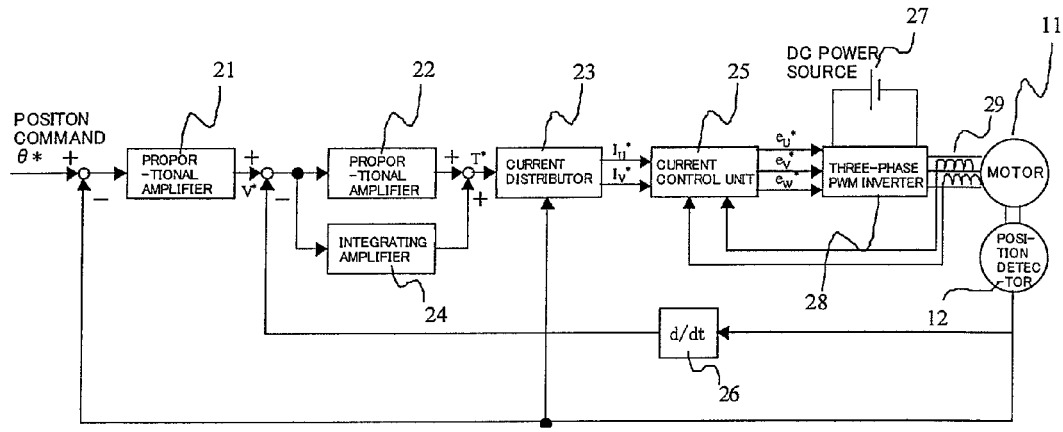
FIG. 8 is a block diagram illustrating a control system for a direct drive motor.

The position command setting unit 46 can include an appropriate input device, such as switches, a keyboard, and dials, which enable an operator to input information/data manually. The motor control system 1 includes constituent elements similar to those described with reference to FIG. 8. These constituent elements are denoted by the same reference numerals, although the descriptions thereof are not repeated.

To obtain a magnetic pole position correction value according to the present embodiment, the torque command value and the magnetic pole position correction value have the following relationship. When the motor type is a linear direct drive motor, the command value should be referred to as a thrust force command value rather than the above-described torque command value. However, in the following description, the thrust force command value should be included in the torque command value.

As understood from the relationship illustrated in FIG. 3, the torque command value is minimized when the magnetic pole position correction value is an optimum correction value. The thrust/torque that can be generated by the same current decreases when the magnetic pole position correction value deviates from the optimum correction value. Therefore, the torque command value becomes greater. Therefore, the deviation in the magnetic pole position correction value can be determined by detecting the magnitude of the torque command value.

To obtain the deviation amount in the magnetic pole position correction value by detecting the magnitude of the torque command value, it is required to bring the direct drive motor into a constant thrust/torque output state. To this end, for example, when the movable range of a rotation axis is not limited, it is useful to employ a method for causing the direct drive motor to rotate at a constant speed by speed control and detecting a torque command T* obtainable in this state.

However, in a case where the movable range of a table is limited, the table cannot rotate at a designated constant speed. Hence, in the present embodiment of the present invention, to cause the direct drive motor to output a constant thrust/torque, a position command different from the present value is applied to the direct drive motor in a state where an appropriate mechanical braking force is applied to the table, and an error is caused in a positional relationship between a command position and the table. Further, when the command position is changeable, an appropriate torque command value (e.g., magnitude in thrust/torque) can be set for the magnetic pole position correction to be performed according to the present invention.

Next, an adjustment procedure of the magnetic pole position correction method according to the first embodiment is described below. The central processing unit 42 provided in the control unit 40 can be configured to execute software control to realize the magnetic pole position correction method. Alternatively, a hardware component can be used to realize a part of the procedure.

In FIG. 2, first, in step S9, the control unit 40 prevents a movement of the table connected to the movable element using a mechanical brake. Next, in step S10, the control unit 40 generates a command that designates a position spaced or separated from the present position. More specifically, the position command setting unit 46 sets the position command A*, automatically or according to a manual operation of an operator, and outputs the position command e* to the proportional amplifier 21. Thus, the direct drive motor is brought into a state where a constant thrust/torque can be output.

On the other hand, an electrical angle offset value is stored beforehand in the memory 44 of the control unit 40. The electrical angle offset value is a value designating a phase difference between a detection origin of the position detector and the magnetic pole position of the movable element. Further, the magnetic pole position correction value required to correct the electrical angle offset value is also stored beforehand in the memory 44 of the control unit 40. The magnetic pole position correction value is manually or automatically changeable.

Next, in step S12, the control unit 40 detects a torque command value generating during a positioning operation of the direct drive motor. In the subsequent step S14, the control unit 40 compares the detected torque command value with a predetermined threshold value. For example, a value stored beforehand in the memory 44 in association with the position command A* can be used as the threshold value.

If it is determined that the torque command value is equal to or greater than the threshold value (NO in step S14), then in step S16, the control unit 40 changes the magnetic pole position correction value. Further, in steps S12 and S14, the control unit 40 detects a torque command value and compares the detected value with the threshold value. The control unit 40 repeats the above-described circulative processing in steps S12, S14, and S16 until a torque command value smaller than the threshold value can be obtained.

The processing to be performed in steps S12, S14, and S16 corresponds to a step of automatically changing the magnetic pole position correction value while monitoring the torque command value and a step of searching for a magnetic pole position correction value at which the torque command value becomes smaller than a predetermined threshold value.

Then, if the magnetic pole position correction value at which the torque command value becomes smaller than the threshold value is found, then in step S18, the control unit 40 stores the detected value in the memory 44. The control unit 40 supplies an electrical angle offset value corrected based on the correction value stored in the memory 44 to the current distributor 23 for the motor control.

A method for obtaining an optimum correction value is, for example, a manual method for searching for a magnetic pole position correction value at which the torque command value T* becomes smaller than a predetermined threshold value while manually changing the magnetic pole position correction value, or an automatic method for obtaining a magnetic pole position correction value at which the torque command value T* becomes smaller than a predetermined threshold value based on a comparison between the torque command value T* and the predetermined threshold value while automatically changing the magnetic pole position correction value.

Either method can be employed to obtain the effects of the present invention. When the method for automatically obtaining a magnetic pole position correction value is employed, an optimum magnetic pole position correction value can be speedily acquired.

As described above, compared to the magnetic pole position correction method discussed in JP 2000-166278 A, the magnetic pole position correction method according to the present embodiment is advantageous in that the table of the direct drive motor is not required to rotate at a constant speed or make one complete revolution during the magnetic pole position correction. Therefore, the magnetic pole position correction method according to the present embodiment is applicable to a table whose movable range is limited.

Second Embodiment

Figure 4:
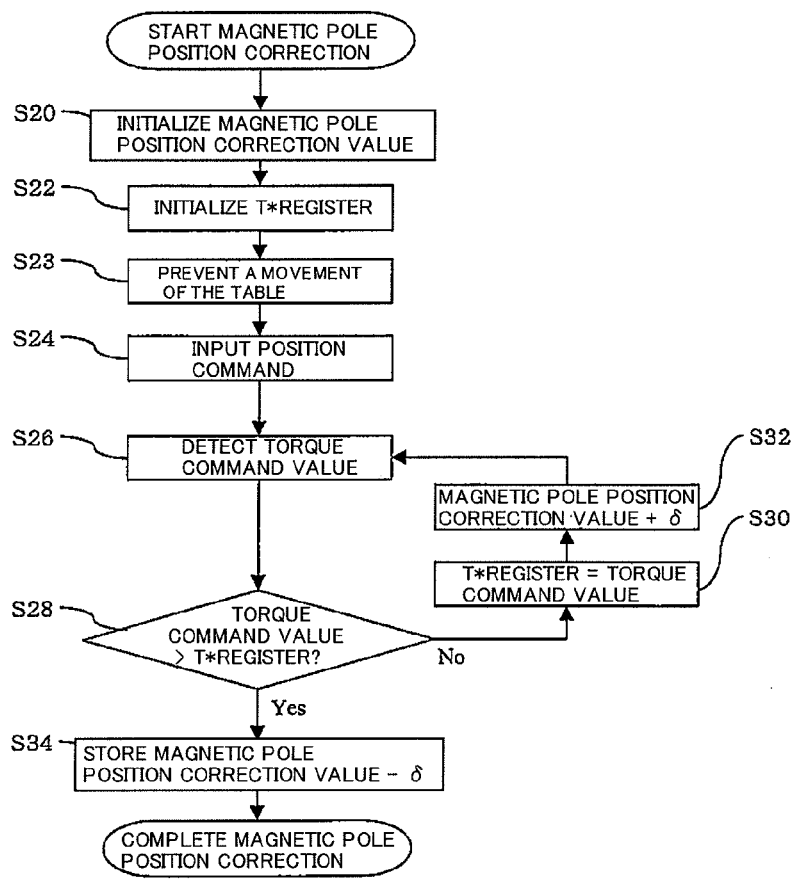
FIG. 4 is a flowchart illustrating a magnetic pole position correction method according to a second embodiment of the present invention.

FIG. 4 is a flowchart illustrating a processing procedure of a motor magnetic pole position correction method according to a second embodiment of the present invention. The method according to the second embodiment is advantageous in that an optimum magnetic pole position correction value can be obtained accurately, when compared to the first embodiment.

In the second embodiment, the memory 44 of the control unit 40 serves as a T*register that stores a magnetic pole position correction value and a torque command value. First, in steps S20 and S22, the control unit 40 initializes the magnetic pole position correction value and also initializes the T*register. In this case, the T*register stores a maximum torque command value that can be applied to the direct drive motor.

Next, in step S23, the control unit 40 prevents the movement of the table connected to the movable element using a mechanical brake. Subsequently, in step S24, the position command θ* having been set automatically or manually via the position command setting unit 46 is supplied to the proportional amplifier 21. The direct drive motor 11 is driven based on the position command θ*. The movable element can be positioned at a predetermined position by the position control.

In this case, in step S26, the control unit 40 detects a torque command value T* required for the direct drive motor 11 to output a predetermined torque that is sufficient to bring the movable element into a stationary state. In the subsequent step S28, the control unit 40 compares the detected torque command value with the value stored in the T*register.

Next, if it is determined that the detected torque command value T* is equal to or less than the value stored in the T*register (NO in step S28), then in step S30, the control unit 40 stores the torque command value T* in the T*register.

In the subsequent step S32, the control unit 40 increments the magnetic pole position correction value by a predetermined value δ. Then, the control unit 40 repeats the above-described processing in steps S26 and S28 to detect the torque command value T* and compare the detected torque command value T* with the value stored in the T*register. The control unit 40 repeats the above-described processing until the detected torque command value T* becomes greater than the value stored in the T*register.

The processing to be performed in steps S26 to S32 corresponds to a step of changing the magnetic pole position correction value, a step of obtaining a difference between a post-change torque command value and a pre-change torque command value, and a step of searching for a magnetic pole position correction value at which the difference changes from a negative value to a positive value.

Then, if the magnetic pole position correction value at which the torque command value becomes greater than the value stored in the T*register is found (YES in step S28), then in step S34, the control unit 40 subtracts the amount δ from the acquired magnetic pole position correction value and stores the finally obtained value in the memory 44 of the control unit 40.

The correction value stored in the memory 44 can be used as a magnetic pole position correction value for the position detector 12. Thus, the control unit 40 completes the magnetic pole position correction processing. The control unit 40 supplies an electrical angle offset value corrected based on the above-described magnetic pole position correction value to the current distributor 23 for the motor control.

The present embodiment is similar to the first embodiment in that a magnetic pole position correction value can be obtained based on a detected torque command value. However, according to the first embodiment, a magnetic pole position correction value that becomes equal to or less than a predetermined threshold value is obtained as a setting value.

On the other hand, according to the present embodiment, a magnetic pole position correction value at which the torque command value is minimized is obtained as a setting value. The present embodiment can obtain an accurate magnetic pole position correction value and can prevent the output torque from decreasing when a mounting error occurs between the direct drive motor 11 and the position detector 12.

As described above, compared to the magnetic pole position correction method discussed in JP 2000-166278 A, the magnetic pole position correction method according to the present embodiment is advantageous in that the table of the direct drive motor is not required to rotate at a constant speed or make one complete revolution during the magnetic pole position correction. Therefore, the magnetic pole position correction method according to the present embodiment is applicable to a table whose movable range is limited.

Third Embodiment

Figure 5:
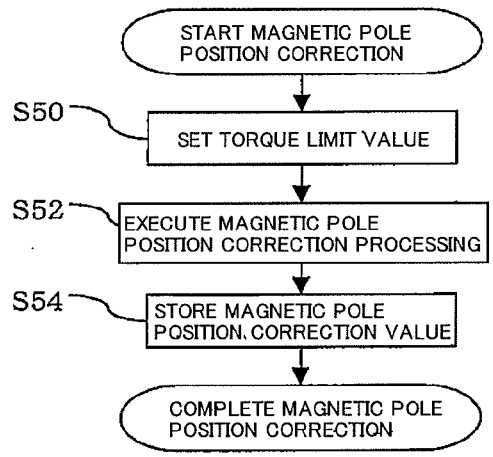
FIG. 5 is a flowchart illustrating a magnetic pole position correction method according to a third embodiment of the present invention.

FIG. 5 is a flowchart illustrating a processing procedure of a motor magnetic pole position correction method according to a third embodiment. The procedure of the magnetic pole position correction method according to the present embodiment is described below with reference to the flowchart illustrated in FIG. 5.

In the magnetic pole position correction method described in the first and second embodiments, if the torque command is set to be equal to or greater than a rated thrust/torque of the motor, the motor may be excessively heated during an adjustment operation and a thermal protector provided in the motor may forcibly stop the adjustment.

To prevent the above-described problem, it is useful to set a torque limit function to prevent the torque command value from exceeding a predetermined constant value. When the torque limit function is set appropriately to hold the torque command to be equal to or less than the rated thrust/torque of the motor, the motor temperature does not exceed a permissible temperature and the motor can be prevented from being excessively heated.

Further, when the braking force is smaller than the thrust force generated by the motor, or when the brake malfunctions for some reason during an adjustment operation, the motor may move beyond the limit of the movable range and collide with a machine if the motor is driven in a state where the torque command value is large. Setting the torque limit function is useful to prevent the above-described undesirable phenomenon beforehand.

More specifically, in step S50, the control unit 40 sets a torque limit value Tlim as an upper limit value of the torque command value T*. An operator can manually operate the input device of the position command setting unit 46 to input the above-described setting value to the control unit 40. Alternatively, the control unit 40 can read a value stored beforehand in the memory 44.

Subsequently, in step S52, the control unit 40 executes magnetic pole position correction processing to obtain an optimum magnetic pole correction value. In the subsequent step S54, the control unit 40 stores the obtained optimum magnetic pole correction value in the memory 44. The magnetic pole position correction procedure according to the third embodiment is subsequently similar to the procedure described with reference to steps S9 to S18 of the flowchart illustrated in FIG. 2 in the first embodiment. The magnetic pole position correction procedure according to the third embodiment is unique in that the control unit 40 compares the torque command value T* detected in step S12 with the above-described torque limit value Tlim and generates a command in such a way as to prevent the torque command value T* from exceeding the above-described torque limit value Tlim.

Then, the control unit 40 sets the magnetic pole position correction value stored in the memory 44 as a magnetic pole position correction value for the position detector 12 and completes the magnetic pole position correction processing. The control unit 40 supplies an electrical angle offset value corrected based on the above-described magnetic pole position correction value to the current distributor 23 for the motor control.

Fourth Embodiment

Figure 6:
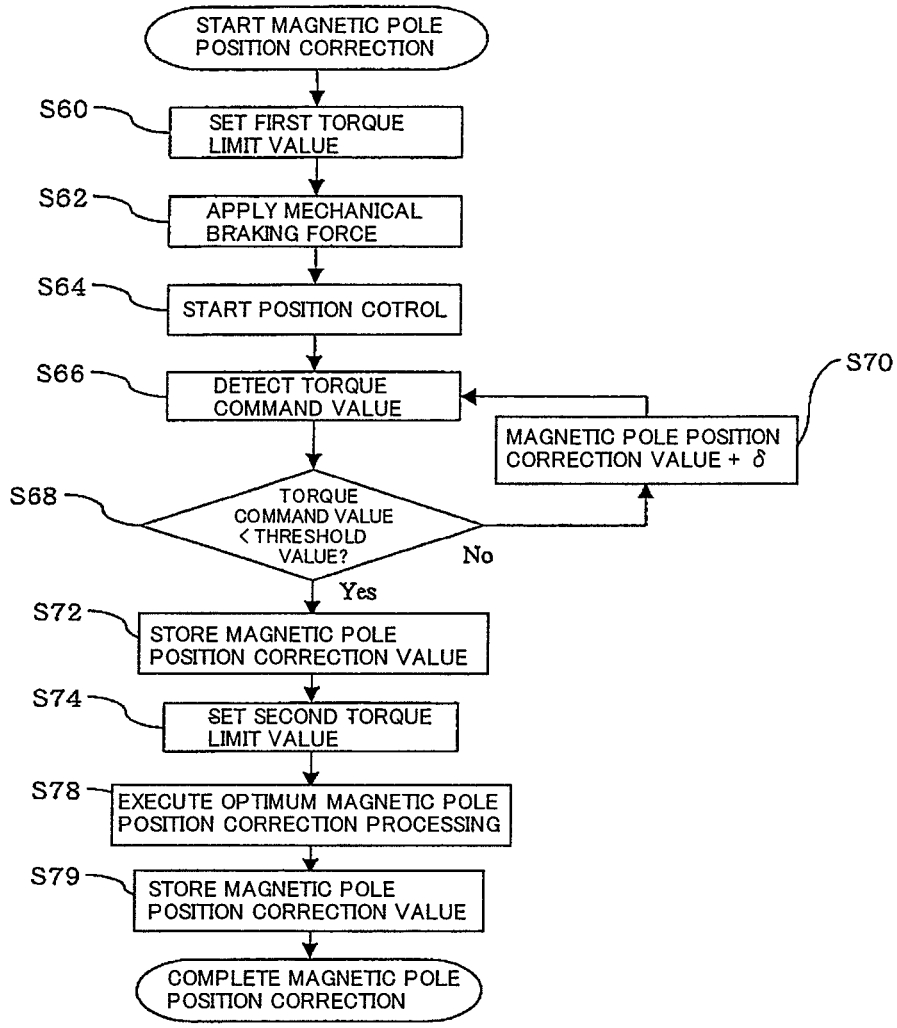
FIG. 6 is a flowchart illustrating a magnetic pole position correction method according to a fourth embodiment of the present invention.

FIG. 6 is a flowchart illustrating a processing procedure of a motor magnetic pole position correction method according to a fourth embodiment of the present invention. In the fourth embodiment, a mechanical brake (not illustrated) is provided to fix a table connected to a movable element. The motor magnetic pole position correction method according to the fourth embodiment is characterized in the following points. The control unit 40 performs position control for the direct drive motor 11 in a state where the braking force is applied by the mechanical brake. The control unit 40 determines whether the direct drive motor 11 is uncontrollable with reference to the torque command value T* of the direct drive motor 11.

If the magnetic pole position correction value is a value bringing the direct drive motor 11 into an uncontrollable state, a small position error may generate an excessive torque command T*. Considering the above-described phenomenon, it is useful to use the magnitude of the torque command value T* to determine whether the current magnetic pole position correction value brings the direct drive motor 11 into an uncontrollable state.

First, in step S60 illustrated in FIG. 6, the control unit 40 sets a first torque limit value Tlim1 as an upper limit value of the torque command value T*. The first torque limit value Tlim1 to be set in step S60 is an extremely small value compared to the braking force of the above-described mechanical brake. Therefore, even when the direct drive motor 11 becomes uncontrollable in a state where a deviation amount of the magnetic pole position correction value is equal to or greater than a predetermined value, the table is fixed stationarily by the braking force.

Next, in step S62, the control unit 40 applies the mechanical braking force to the movable element to hold the movable element in a stationary state. In step S64, the control unit 40 starts position control for the direct drive motor 11. Then, in step S66, the control unit 40 detects and confirms the torque command value T* generated in the state where the movable element is fixed.

In the subsequent step S68, the control unit 40 compares the torque command value T* with a threshold value T*thr. The threshold value T*thr is a value determined beforehand to calculate a magnetic pole position correction value capable of preventing the motor from becoming uncontrollable. In other words, the threshold value T*thr is usable to determine whether the torque command value T* is excessive. The threshold value T*thr is a value comparable to the first torque limit value Tlim1.

If it is determined that the torque command value T* is equal to or greater than the threshold value T*thr (NO in step S68), then in step S70, the control unit 40 increases the magnetic pole position correction value by an amount δ. Then, the control unit 40 repeats the above-described processing in steps S66 and S68 to detect the torque command value T* and compare the detected torque command value T* with the threshold value T*thr. The control unit 40 repeats the above-described operation until the torque command value T* becomes smaller than the threshold value T*thr.

Then, if the magnetic pole position correction value at which the torque command value T* becomes smaller than the threshold value T*thr is found (YES in step S68), then in step S72, the control unit 40 stores the detected value in the memory 44.

Subsequently, in step S74, the control unit 40 sets a second torque limit value Tlim2 for the torque command value T*. The second torque limit value Tlim2 set in this case is equal to or less than the rated thrust/torque of the direct drive motor.

Then, in step S78, the control unit 40 performs optimum magnetic pole position correction processing. Then, in step S79, the control unit 40 stores an obtained optimum magnetic pole position correction value in the memory 44. The control unit 40 can use the obtained optimum magnetic pole position correction value as a magnetic pole position correction value of the position detector 12. Then, the control unit 40 completes the magnetic pole position correction.

The control unit 40 generates an electrical angle offset value corrected based on the above-described magnetic pole position correction value and supplies the generated electrical angle offset value to the current distributor 23 for the motor control.

A positioning structure capable of positioning the position detector 12 on the rotary direct drive motor in such a way as to mount the position detector 12 to have a specific positional relationship with the rotary direct drive motor is described in detail below with reference to FIG. 7.

The direct drive motor includes a stator 31 having a three-phase winding and a movable element 32 having numerous permanent magnets disposed along the outer circumferential direction thereof to form N-poles and S-poles arrayed alternately.

The position detector 12 includes a sensor 33 and a detection gear 34 (i.e., a target to be detected by the sensor 33). The stator 31 is fixed to a stator housing 36 with fastening bolts 60. The detection gear 34 is fixed to the movable element 32 with fastening bolts 61.

Figure 9:
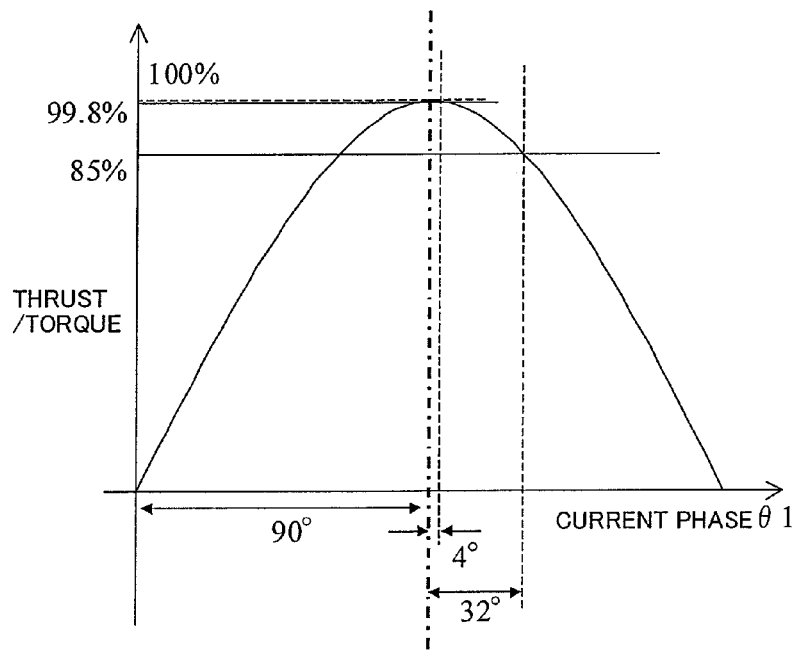
FIG. 9 illustrates a relationship between current phase difference and thrust/torque of a motor.

A positioning structure capable of mounting the direct drive motor 11 and the position detector 12 in a predetermined angular range to prevent the direct drive motor 11 and the position detector 12 from becoming uncontrollable is described below. In the present exemplary embodiment, the uncontrollability preventing angular range is the ±90° range in terms of the electrical angle, in which the output torque has a positive value, as illustrated in FIG. 9. To satisfy the above-described angular requirement, the direct drive motor 11 and the position detector 12 are assembled together to have a specific positional relationship. Further, an optimum electrical angle offset value is set to the control system 1.

To this end, it is necessary to assemble the direct drive motor 11 in such a way as to maintain a constant positional relationship between the stator 31, the movable element 32, the sensor 33, and the detection gear 34. For example, as illustrated in FIG. 7, a U-phased slot center of the stator 31, an S-pole of the permanent magnet of the movable element 32, the center of the sensor 33, and a Z-phase 35 of the detection gear 34 are aligned along a straight line when the stator 31, the movable element 32, the sensor 33, and the detection gear 34 are assembled together.

However, when the fastening bolts 60 and 61 are disposed at uniform pitches, the above-described members may be erroneously assembled when a worker makes a mistake, because the members can be assembled even when they are angularly offset from one another. Thus, the electrical angle offset having been set and the positional relationship between the direct drive motor 11 and the position detector 12 may bring the motor into an uncontrollable state.

Hence, it is useful to dispose the fastening bolts 60 and 61 at irregular pitches because the above-described members cannot be assembled unless the members are correctly set to have a predetermined pitch relationship. In other words, the direct drive motor 11 and the position detector 12 can be assembled together to have the specific positional relationship in any case.

Figure 7:
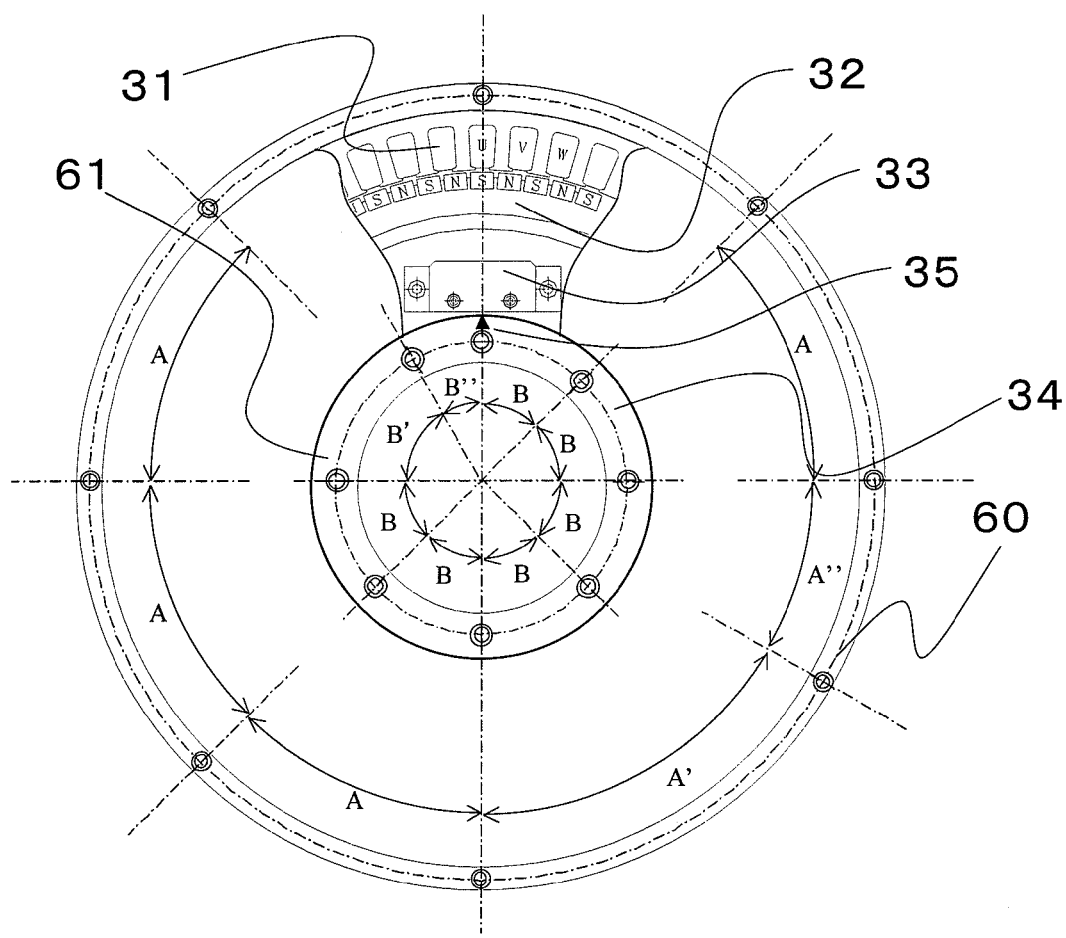
FIG. 7 illustrates a side surface of a direct drive motor and a position detector that are regulated by a positioning mechanism capable of assembling the direct drive motor and the position detector to have a specific positional relationship.

According to the example illustrated in FIG. 7, the stator 31 and the stator housing 36 are assembled together by means of eight fastening bolts 60, in which seven fastening bolts 60 are disposed at uniform pitches (angle A) in the circumferential direction and the remaining one fastening bolt 60 is disposed at an irregular pitch (A"<A<A'). Further, the detection gear 34 is fixed to the movable element 32 with eight fastening bolts 61, in which seven fastening bolts 61 are disposed at uniform pitches (angle B) in the circumferential direction and the remaining one fastening bolt 61 is disposed at an irregular pitch (B"<B<B').

The positioning structure for assembling the direct drive motor 11 in such a way as to maintain a constant positional relationship between the stator 31, the movable element 32, the sensor 33, and the detection gear 34 is not limited to the above-described layout applicable to the fastening bolts. Any other appropriate structure may be employed. For example, a coupling structure including keys and key grooves coupling with each other can be used.

The above-described positioning structure capable of mounting the direct drive motor 11 and the position detector 12 in a predetermined angular range to prevent the direct drive motor 11 and the position detector 12 from becoming uncontrollable is applicable to a linear direct drive motor. As described above, the positioning structure according to the present embodiment can prevent a worker from making a mistake in an assembling operation because of the provision of an appropriate mechanism for regulating a motor and a position detector in such a way as to have a predetermined positional relationship when engaged.

What is claimed is:

1. A motor magnetic pole position correction method for correcting a relative positional relationship between a movable element position of a direct drive motor and a movable element position detection value detected by a position detector attached to the direct drive motor, the method comprising:
   a step of preventing movement of a movable element of the direct drive motor by a mechanical brake;
   a step of inputting a position command that designates a position different from a present value as a commanded movable element position of the direct drive motor;
   a step of detecting a torque command value of the direct drive motor;
   a step of determining a magnetic pole position correction value based on a comparison between the detected torque command value and a predetermined threshold value;
   a step of storing the determined magnetic pole position correction value in a memory; and
   a step of performing motor control using an electrical angle offset value obtained based on the magnetic pole position correction value stored in the memory.

2. The motor magnetic pole position correction method according to claim 1, wherein
   the step of determining the magnetic pole position correction value, comprises:
   a step of automatically changing the magnetic pole position correction value while monitoring the torque command value, and a step of searching for a magnetic pole position correction value at which the torque command value becomes smaller than the predetermined threshold value.

3. The motor magnetic pole position correction method according to claim 1, wherein
   the step of determining the magnetic pole position correction value comprises:
   a step of changing the magnetic pole position correction value;
   a step of obtaining a difference between a post-change torque command value and a pre-change torque command value; and
   a step of searching for a magnetic pole position correction value at which the difference changes from a negative value to a positive value.

4. The motor magnetic pole position correction method according to claim 1, wherein an upper limit value is set for the torque command value.

5. The motor magnetic pole position correction method according to claim 1, further comprising:
   a step of determining that the direct drive motor is in an uncontrollable state if the torque command value of the direct drive motor exceeds the threshold value having been set beforehand when a position control of the direct drive motor is performed in the state where the mechanical braking force is applied to stop the movable element, which is added as a step preceding the step of inputting the position command that designates the position different from the present value as the commanded movable element position of the direct drive motor.

6. The motor magnetic pole position correction method according to claim 1, wherein the direct drive motor and the sensor are positioned and mounted in such a manner that a mounting angle between the direct drive motor and the sensor is in an electrical angle range of ±90 with respect to an optimum magnetic pole position correction value positioned at the center thereof.

* * * * *